(12) United States Patent
Watanabe (10) Patent No.: US 10,562,513 B2
(45) Date of Patent: Feb. 18, 2020

(54) CONTROL APPARATUS FOR FOUR-WHEEL-DRIVE VEHICLE

(71) Applicant: Toyota Jidosha Kabushiki Kaisha, Toyota-shi, Aichi-ken (JP)

(72) Inventor: Ryochi Watanabe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/190,986

(22) Filed: Nov. 14, 2018

(65) Prior Publication Data

US 2019/0143955 A1 May 16, 2019

(30) Foreign Application Priority Data

Nov. 16, 2017 (JP) .................. 2017-220650

(51) Int. Cl.
| | | |
|---|---|---|
| *B60W 10/119* | (2012.01) | |
| *B60W 40/114* | (2012.01) | |
| *B60W 30/188* | (2012.01) | |
| *B60W 10/184* | (2012.01) | |
| *B60W 30/02* | (2012.01) | |
| *B60W 40/13* | (2012.01) | |

(52) U.S. Cl.
CPC ......... *B60W 10/119* (2013.01); *B60W 40/114* (2013.01); *B60W 10/184* (2013.01); *B60W 30/02* (2013.01); *B60W 30/188* (2013.01); *B60W 2040/1346* (2013.01); *B60W 2520/14* (2013.01); *B60W 2720/406* (2013.01); *Y10T 477/648* (2015.01)

(58) Field of Classification Search
CPC ............ Y10T 477/648; B60W 10/119; B60W 40/114; B60W 2040/1346; B60W 30/02; B60W 10/184; B60W 30/188; B60W 2520/14; B60W 2720/406
USPC .............................................. 701/69, 72, 87
See application file for complete search history.

(56) References Cited

U.S. PATENT DOCUMENTS

| | | | | |
|---|---|---|---|---|
| 2005/0064993 | A1* | 3/2005 | Ginther ................. | B60K 23/04 477/166 |
| 2007/0029127 | A1 | 2/2007 | Mori et al. | |
| 2008/0029328 | A1* | 2/2008 | Hoeck .................... | B60K 17/35 180/248 |
| 2012/0166055 | A1* | 6/2012 | Ozawa .................. | B60K 23/08 701/69 |
| 2015/0073670 | A1* | 3/2015 | Matsuno ............... | B60K 17/35 701/53 |
| 2019/0202440 | A1* | 7/2019 | Watanabe ............ | B60W 10/02 |

FOREIGN PATENT DOCUMENTS

| | | |
|---|---|---|
| JP | 2007-045194 A | 2/2007 |
| JP | 2010-260488 A | 11/2010 |

* cited by examiner

Primary Examiner — Roger L Pang
(74) Attorney, Agent, or Firm — Dinsmore & Shohl LLP (57) ABSTRACT

A control apparatus for a four-wheel-drive vehicle is configured to determine whether or not a degree of a yaw movement for deflecting the vehicle to a left or right side is larger than a predetermined first degree. When the degree of the yaw movement is larger than the first degree, the control apparatus increases a coupling torque of a coupling device corresponding to a rear wheel at the same side as a direction of the yaw movement to a predetermined first torque value, and maintains at zero a coupling torque of a coupling device corresponding to a rear wheel at an opposite side to the direction of the yaw movement.

4 Claims, 6 Drawing Sheets

CONTROL APPARATUS FOR FOUR-WHEEL-DRIVE VEHICLE

CLAIM OF PRIORITY

The present application claims priority from Japanese patent application JP 2017-220650 filed on Nov. 16, 2017, the content of which is hereby incorporated by reference into this application.

BACKGROUND

1. Technical Field

The present disclosure relates to a control apparatus which is applied to a four-wheel-drive vehicle including a front-wheel differential gear device configured to transmit a driving force generated by a driving device to left and right front wheels, and a rear-wheel final gear device configured to transmit the driving force to left and right rear wheels via a coupling device. Hereinafter, the four-wheel-drive vehicle is also simply referred to as a "vehicle".

2. Description of the Related Art

A control apparatus (hereinafter, referred to as a "related-art apparatus") for the vehicle that is conventionally known is configured to, when a yaw rate is higher than a predetermined value during braking of the vehicle, selectively perform a pressure increasing process or a pressure reducing process for a wheel cylinder(s) of one or both of the left rear wheel and the right rear wheel (See Japanese Patent Application Laid-Open (kokai) 2010-260488 A). Hereinafter, such a control is referred as a "braking control".

By performing the above-mentioned braking control, the related-art apparatus generates a yaw moment in a direction opposite to a yaw movement occurring in the vehicle (that is, a moment in a direction to cancel out the yaw movement) to thereby suppress the yaw movement.

In general, the vehicle includes a hydraulic circuit as a mechanism for applying a braking force to each wheel. For example, the hydraulic circuit includes a first valve (pressure increasing valve) configured to selectively open or close a fluid passage provided between a wheel cylinder of each wheel and a master cylinder (high pressure source) in which a pressure is increased or decreased in response to a depression amount of a brake pedal, and a second valve (pressure reducing valve) configured to selectively open or close a fluid passage provided between a reservoir tank (low pressure source) and the wheel cylinder of each wheel. The related-art apparatus controls each of the first valve and the second valve to thereby perform the above-mentioned braking control. Typically, a solenoid valve is used as each of the first valve and the second valve.

In the related-art apparatus, there is a problem that an operating sound of the solenoid valve is generated while the above-mentioned braking control is being performed. Further, since the related-art apparatus opens or closes the solenoid valve during braking of the vehicle, there is a possibility that the opening and closing of the solenoid valve cause a change in a hydraulic pressure to thereby produce a vibration in the brake pedal. Therefore, there is also a problem that the driver feels discomfort when the driver operates the brake pedal.

SUMMARY

One or more embodiments have been devised in view of the above-mentioned problem. Specifically, there is provided a control apparatus for the four-wheel-drive vehicle which can suppress a yaw movement occurring in the vehicle during braking of the vehicle without controlling the solenoid valve.

According to one embodiment, there is provided a control apparatus for a four-wheel-drive vehicle, including:

a driving device (20) configured to generate a driving force;

a braking device (40) configured to apply a braking force to a left front wheel (WFL), a right front wheel (WFR), a left rear wheel (WRL) and a right rear wheel (WRR);

a front wheel differential device (31) configured to transmit the driving force to a left front wheel axle (32L) and a right front wheel axle (32R), and allow a differential between the left front wheel axle and the right front wheel axle;

a transfer gear device (33) configured to transmit the driving force to a rear wheel side through a propeller shaft (34);

a rear wheel final gear device (35) configured to transmit the driving force from the propeller shaft to a left rear wheel axle (38L) and a right rear wheel axle (38R);

a first coupling device (361) configured to control a coupling torque between a driving output part of the rear wheel final gear device and the left rear wheel axle to change a transmission degree of the driving force to the left rear wheel axle; and a second coupling device (362) configured to control a coupling torque between the driving output part and the right rear wheel axle to change a transmission degree of the driving force to the right rear wheel axle.

Further, a final gear ratio on a side of the rear wheels is set to be smaller than a final gear ratio on a side of the front wheels.

The control apparatus further includes:

a detector (82, 83, 85, 86) configured to detect traveling state information indicative of a current traveling state of the vehicle; and a controller (60) configured to change the coupling torque of the first coupling device and the coupling torque of the second coupling device independently, based on the traveling state information detected by the detector.

Further, when the coupling torque of the first coupling device and the coupling torque of the second coupling device are both zero and the braking device applies the braking force to the left front wheel, the right front wheel, the left rear wheel and the right rear wheel, the controller is configured to:

based on the traveling state information detected by the detector, determine whether or not a degree of a yaw movement for deflecting the vehicle to a left or right side is larger than a predetermined first degree due to the braking force (Step 404, Step 409); and when the controller determines that the degree of the yaw movement is larger than the first degree, perform a yaw movement suppression control (Step 404:Yes, Step 405 and Step 406; Step 409:Yes, Step 410 and Step 411).

The yaw movement suppression control is a control (programmed) to increase the coupling torque of the coupling device corresponding to the rear wheel at the same side as a direction of the yaw movement from among the first coupling device and the second coupling device to a predetermined first torque value which is larger than zero; and maintain at zero the coupling torque of the coupling device corresponding to the rear wheel at an opposite side to the direction of the yaw movement from among the first coupling device and the second coupling device.

When the degree of the yaw movement for deflecting the vehicle to the left or right side becomes large during braking of the vehicle, the control apparatus sets the coupling torque of the coupling device corresponding to the rear wheel at the same side as the direction of the yaw movement to the first torque value which is larger than zero, and maintains at zero the coupling torque of the coupling device corresponding to the rear wheel at the opposite side to the direction of the yaw movement. Further, in the four-wheel-drive vehicle to which the present control apparatus is applied, the final gear ratio at the side of the rear wheels is smaller than the final gear ratio at the side of front wheels. Therefore, a wheel speed of the rear wheel at the same side as the direction of the yaw movement becomes higher than a wheel speed of the rear wheel at the opposite side to the direction of the yaw movement. Accordingly, the control apparatus can generate a yaw moment in a direction opposite to the yaw movement occurring in the vehicle (that is, a moment in a direction to cancel out the yaw movement). Consequently, the control apparatus can suppress the yaw movement occurring during braking of the vehicle. Further, unlike the above related-art apparatus, the control apparatus does not control a solenoid valve when performing the above-mentioned yaw movement suppression control. Therefore, an operating sound of the solenoid valve is not generated, and vibration of a brake pedal due to opening and closing of the solenoid valve also is not generated. Accordingly, the control apparatus can suppress discomfort feeling when the driver operates the brake pedal during braking of the vehicle.

In an aspect of the control apparatus, the controller is configured to determine whether or not the degree of the yaw movement is suppressed to a predetermined second degree which is smaller than the first degree during the yaw movement suppression control, based on the traveling state information, when the controller determines that the degree of the yaw movement is suppressed to the second degree, decrease the coupling torque of the coupling device corresponding to the rear wheel at the same side as the direction of the yaw movement to a predetermined second torque value which is smaller than the first torque value (Step 404:No, Step 415 and Step 416; Step 409:No, Step 418 and Step 419).

The controller according to the present aspect is configured to, when it is determined that the degree of the yaw movement is suppressed/decreased to the second degree which is smaller than the first degree, decrease the coupling torque of the coupling device corresponding to the rear wheel at the same side as the direction of the yaw movement to the second torque value. Accordingly, after the yaw movement of the vehicle is suppressed, the yaw moment in the direction opposite to that yaw movement is gradually decreased. Thus, the present aspect can reduce the possibility that the behavior of the vehicle is suddenly changed after the yaw movement of the vehicle is suppressed, so that the vehicle can be made to smoothly face in the original traveling direction (traveling direction before the deflection).

In an aspect of the control apparatus, the controller is configured to change the coupling torque in such a manner that a magnitude (K2) of change amount of the coupling torque per unit time when decreasing the coupling torque to the second torque value is smaller than a magnitude (K1) of change amount of the coupling torque per unit time when increasing the coupling torque to the first torque value.

According to the present aspect, since the magnitude (K1) of change amount of the coupling torque is relatively large, the control apparatus can suppress the yaw movement of the vehicle generated due to the braking force in a rapid manner. Further, since the magnitude (K2) of change amount of the coupling torque is relatively small, the present aspect can reduce the possibility that the behavior of the vehicle is suddenly changed after the yaw movement of the vehicle is suppressed. Accordingly, the vehicle can be made to smoothly face in the original traveling direction.

In an aspect of the control apparatus, the control apparatus further includes a mechanism (336 and 367) configured to selectively transmit the driving force or not transmit the driving force (that is, shut off the transmission of the driving force) at one or more positions between the driving device and the rear wheel final gear device to switch a state of the vehicle between a four-wheel-drive state and a two-wheel-drive state, wherein, in a case where the vehicle is in the two-wheel-drive state, the controller is configured to, when the degree of the yaw movement becomes larger than the first degree, control the mechanism to change the state of the vehicle from the two-wheel-drive state to the four-wheel-drive state (Step 601:Yes, Step 603), and thereafter, perform the yaw movement suppression control (Step 404:Yes, Step 405 and Step 406; Step 409:Yes, Step 410 and Step 411).

According to the present aspect, in the case where the vehicle is in the two-wheel-drive state, when the degree of the yaw movement becomes larger than the first degree, the controller changes/transmits the state of the vehicle from the two-wheel-drive state to the four-wheel-drive state so as to transmit the driving force of the driving device to the side of the rear wheels. After the state of the vehicle is changed to the four-wheel-drive state, the controller according to the present aspect performs the yaw movement suppression control. Therefore, since the control apparatus according to the present aspect generates the yaw moment in the direction opposite to the yaw movement, the yaw movement occurring in the vehicle can be suppressed.

In the above description, in order to facilitate understanding of the above one or more aspect of the embodiment, a name and/or reference numeral used in embodiments described below is enclosed in parentheses and assigned to each of the constituent features corresponding to the embodiments. However, each of the constituent features is not limited to the embodiments defined by the name and/or reference numeral.

DETAILED DESCRIPTION OF THE EMBODIMENTS

Now, referring to the accompanying drawings, a description is given of embodiments. The accompanying drawings are illustrations of one or more specific embodiments in conformity with the principle thereof, but those illustrations are examples to be used for the understanding of the embodiment(s), and are not to be used to limit the interpretation of the present disclosure.

First Embodiment

Figure 1:
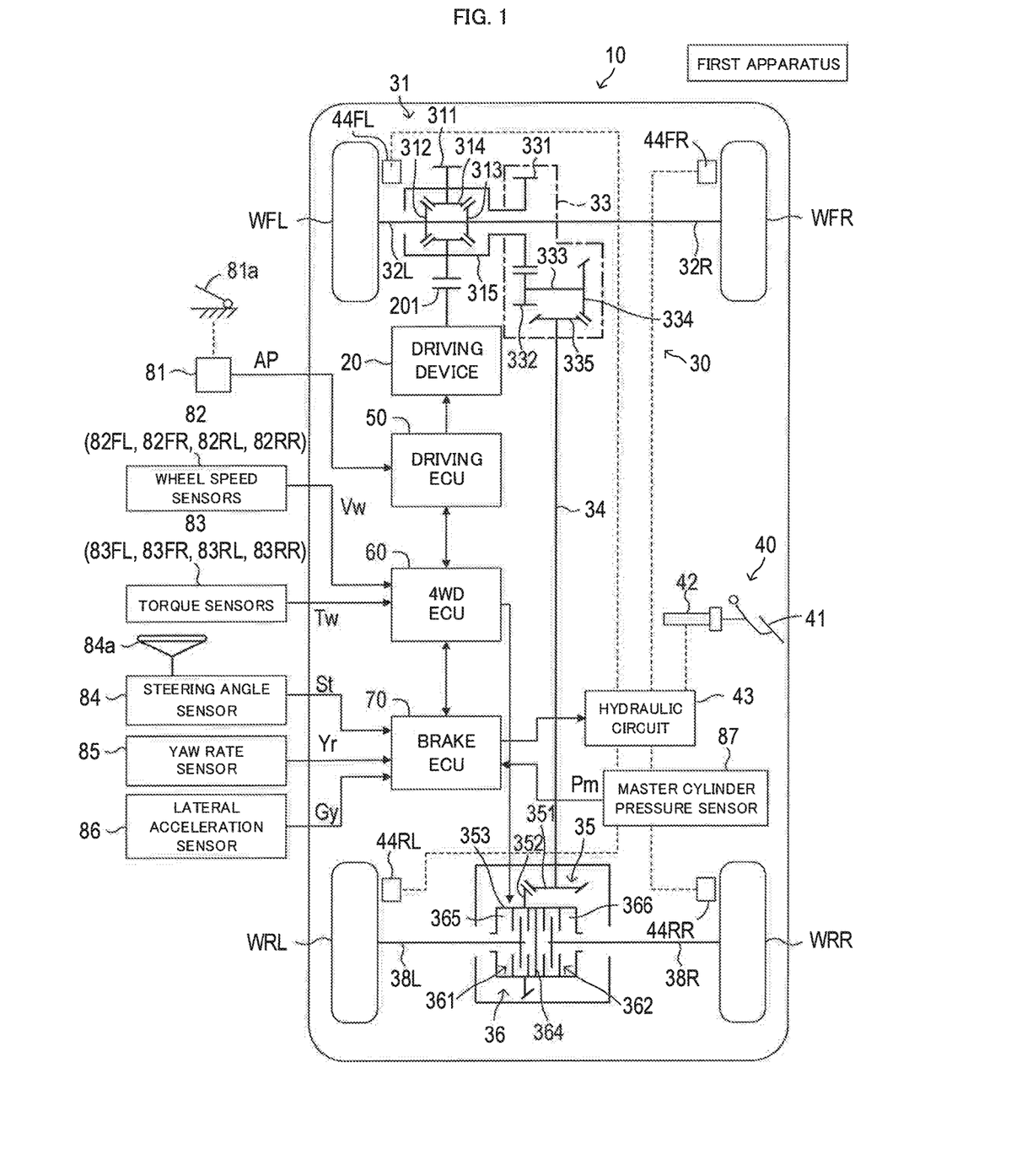
FIG. 1 is a schematic configuration diagram for illustrating a four-wheel-drive vehicle according to a first embodiment, and a control apparatus according to the first embodiment applied to the four-wheel-drive vehicle.

As illustrated in FIG. 1, a control apparatus (hereinafter, referred to as a "first apparatus") according to a first embodiment is applied to a four-wheel-drive vehicle 10.

The vehicle 10 includes a driving device 20, a driving force transmitting device 30, a braking device 40, a driving ECU 50, a 4WD ECU 60, and a brake ECU 70. The driving ECU 50, the 4WD ECU 60 and the brake ECU 70 correspond to a part of the control apparatus according to the present disclosure. In addition, two or more ECUs among the above-mentioned ECUs may be integrated into one ECU.

Those ECUs are electric control units each including a microcomputer as a main part, and are connected to one another so as to be able to mutually transmit and receive information via a controller area network (CAN) (not shown). The microcomputer herein includes a CPU, a RAM, a ROM, an interface I/F, and the like. The CPU executes instructions (programs and routines) stored in the ROM to realize various functions described later.

The driving device 20 generates a driving force. The driving device 20 drives wheels of the vehicle 10 (a left front wheel WFL, a right front wheel WFR, a left rear wheel WRL and a right rear wheel WRR) through the driving force transmitting device 30. The driving device 20 includes a combination of an engine and a transmission for a typical vehicle. The driving device 20 may include any one of driving devices for a vehicle which are well known in the art, such as a combination of an electric motor and a transmission, as well as a combination of an engine, an electric motor and a transmission.

The driving force transmitting device 30 includes a front wheel differential device 31, a left front wheel axle 32L, a right front wheel axle 32R, a transfer gear device 33, a propeller shaft 34, a rear wheel final gear device 35, a clutch device 36, a left rear wheel axle 38L, a right rear wheel axle 38R, and the like.

The front wheel differential device 31 includes a drive gear 311, a left side gear 312, a right side gear 313, a pinion gear 314, and a front differential case 315. The drive gear 311 engages with a transmission output gear 201 which outputs the driving force generated by the driving device 20. The left side gear 312 is directly coupled to the left front wheel axle 32L, and rotates integrally with the left front wheel axle 32L. The right side gear 313 is directly coupled to the right front wheel axle 32R and rotates integrally with the right front wheel axle 32R. The left side gear 312 and the right side gear 313 are coupled by the pinion gear 314. The front differential case 315 is directly coupled to the drive gear 311 and rotates integrally with the drive gear 311. Further, the front differential case 315 accommodates the left side gear 312, the right side gear 313, and the pinion gear 314. With such a configuration, the front wheel differential device 31 transmits the driving force generated by the driving device 20 to the left front wheel axle 32L and the right front wheel axle 32R, and distributes the driving force to the left front wheel axle 32L and the right front wheel axle 32R while allowing for differential between those front wheel axles.

The transfer gear device 33 includes an input gear 331, a counter gear 332, a counter shaft 333, a first ring gear 334, and a first pinion gear 335. The input gear 331 is directly coupled to the front differential case 315 and rotates integrally with the front differential case 315. The counter gear 332 engages with the input gear 331. One end of the counter shaft 333 is coupled to the counter gear 332, and the other end of the counter shaft 333 is coupled to the first ring gear 334. Therefore, the first ring gear 334 rotates integrally with the counter gear 332. The first pinion gear 335 engages with the first ring gear 334. The first pinion gear 335 is coupled to a front end of the propeller shaft 34 and rotates integrally with the propeller shaft 34. The first pinion gear 335 and the first ring gear 334 constitute a so-called hypoid gear in which the first pinion gear 335 engages with the first ring gear 334 in such a manner that an axial center of the first pinion gear 335 is offset from a rotation center of the first ring gear 334. With such a configuration, the transfer gear device 33 transmits the driving force to the rear wheel side via the propeller shaft 34.

The rear wheel final gear device 35 includes a second pinion gear 351, a second ring gear 352, a rear differential case 353, and the like. The second pinion gear 351 is coupled to a rear end of the propeller shaft 34 and rotates integrally with the propeller shaft 34. The second ring gear 352 engages with the second pinion gear 351. The rear differential case 353 is a cylindrical case arranged coaxially with the left rear wheel axle 38L and the right rear wheel axle 38R, and is directly coupled to the second ring gear 352. Therefore, the rear differential case 353 is configured to rotate integrally with the second ring gear 352 around the left rear wheel axle 38L and the right rear wheel axle 38R. The second pinion gear 351 and the second ring gear 352 constitute a hypoid gear. The rear differential case 353 will be also referred to as a "driving force output part". With such a configuration, the rear wheel final gear device 35 transmits the driving force from the propeller shaft 34 to the left rear wheel axle 38L and the right rear wheel axle 38R.

In the present embodiment, a final gear ratio on the side of the rear wheels (that is, the left rear wheel WRL and the right rear wheel WRR) is set to be smaller than a final gear ratio on the side of the front wheels (that is, the left front wheel WFL and the right front wheel P WFR). For example, a final gear ratio of the front wheel differential device 31 and a final gear ratio of the rear wheel final gear device 35 are set in such a manner that the wheel speeds of the rear wheels WRL and WRR are increased by 2% to 5% compared to the wheel speeds of the front wheels WFL and WFR.

The clutch device 36 includes a first clutch 361 and a second clutch 362. The first clutch 361 is arranged between the rear wheel final gear device 35 and the left rear wheel axle 38L. The first clutch 361 controls a transmission torque between the rear differential case 353 and the left rear wheel axle 38L to change a transmission degree of the driving force to the left rear wheel axle 38L. The second clutch 362 is arranged between the rear wheel final gear device 35 and the right rear wheel axle 38R. The second clutch 362 controls a transmission torque between the rear differential case 353 and the right rear wheel axle 38R to change a transmission degree of the driving force to the right rear wheel axle 38R. The first clutch 361 and the second clutch 362 are independently-variable-control-type clutches configured to independently change the transmission torque in response to a command from the 4WD ECU 60, respectively. The above-mentioned transmission torque will be also referred to as a "coupling torque". Further, the first clutch 361 and the second clutch 362 are also referred to as a "first coupling device 361" and a "second coupling device 362", respectively. A partition wall 364 is provided at a central portion of the rear differential case 353 in an axial direction (left-right direction of the vehicle). A first clutch chamber 365 is formed on the left side of the vehicle with respect to the partition wall 364, and a second clutch chamber 366 is formed on the right side of the vehicle with respect to the partition wall 364. The first clutch 361 is accommodated in the first clutch chamber 365, and the second clutch 362 is accommodated in the second clutch chamber 366. The configuration of the clutch device 36 is well known as described in Japanese Patent Application Laid-Open No. 2007-45194, which is hereby incorporated by reference into this application. Each of the first clutch 361 and the second clutch 362 is a clutch in which a multiple disk type clutch and an electromagnetic clutch are combined.

Hereinafter, a state in which the driving force is transmitted to the rear wheel axles (38L and 38R) will be also referred to as a "first state". In other words, the first state is a state in which the coupling torques of the clutches (361 and 362) are set to a value larger than zero. Further, a state in which the driving force is not transmitted to the rear wheel axles (38L and 38R) will be also referred to as a "second state". In other words, the second state is a state in which the coupling torques of the clutches (361 and 362) are set to zero.

The braking device 40 includes a brake pedal 41, a master cylinder 42, a hydraulic circuit 43, wheel cylinders 44 (44FL, 44FR, 44RL and 44RR), and the like.

The braking force for each of the wheels (the left front wheel WFL, the right front wheel WFR, the left rear wheel WRL and the right rear wheel WRR) is controlled by controlling a braking pressure of the corresponding wheel cylinder (44FL, 44FR, 44RL and 44RR) by using the hydraulic circuit 43 of the braking device 40. The hydraulic circuit 43 includes a reservoir (not shown), an oil pump (not shown), various valve devices (not shown) and the like, and functions as a brake actuator.

The driving ECU 50 is electrically connected to the 4WD ECU 60 and the brake ECU 70, and is configured to mutually transmit and receive information via a controller area network (CAN) (not shown). The driving ECU 50 is electrically connected to various sensors including an accelerator opening sensor 81, and is configured to receive output signals from those sensors. The accelerator opening sensor 81 is configured to generate an output signal indicative of a depression amount (hereinafter, also referred to an "accelerator opening") AP of an acceleration pedal 81a configured to be operated by the driver. The driving ECU 50 is electrically connected to the driving device 20. The driving ECU 50 is configured to transmit various signals for controlling the driving device 20 based on the depression amount AP of the acceleration pedal 81a and an operation state of a shift lever (not shown).

The 4WD ECU 60 is electrically connected to wheel speed sensors 82 (82FL, 82FR, 82RL and 82RR) and torque sensors 83 (83FL, 83FR, 83RL and 83RR), and is configured to receive output signals from those sensors. Although not illustrated in FIG. 1, the 4WD ECU 60 is also electrically connected to a steering angle sensor 84, a yaw rate sensor 85 and a lateral acceleration sensor 86, and is configured to receive output signals from those sensors.

Each of the wheel speed sensors 82 is configured to generate one pulse each time the corresponding wheel rotates by a predetermined angle. The 4WD ECU 60 counts the number of pulses generated by the wheel speed sensor 82 per unit time to calculate a speed (that is, wheel speed) of the wheel provided with that wheel speed sensor 82 based on the counted value. More specifically, the 4WD ECU 60 calculates the wheel speed Vw based on the following Expression (1). In Expression (1), "r" is a dynamic radius of the wheel, "ω" is an angular velocity of the wheel, "N" is the number of teeth of a rotor (number of pulses generated per rotation of the rotor), "Ni" is the number of pulses counted per unit time (measurement time) ΔT.

$$Vw = r \cdot \omega = r \cdot (2 \cdot \pi / N) \cdot (Ni / \Delta T) \quad (1)$$

In the above manner, the 4WD ECU 50 is configured to acquire a wheel speed Vwfl of the left front wheel WFL, a wheel speed Vwfr of the right front wheel WFR, a wheel speed Vwrl of the left rear wheel WRL, and a wheel speed Vwrr of the right rear wheel WRR.

Each of the torque sensors 83 (83FL, 83FR, 83RL and 83RR) generates an output signal indicative of a driving torque (Twfl, Twfr, Twrl and Twrr) acting on the corresponding wheel axle (the left front wheel axle 32L, the right front wheel axle 32R, the left rear wheel axle 38L and the right rear wheel axle 38R).

Further, the 4WD ECU 60 is electrically connected to the rear wheel final gear device 35 and the clutch device 36. The 4WD ECU 60 controls the coupling torque of the first clutch 361 and the coupling torque of the second clutch 362 based on the accelerator opening AP, the wheel speeds Vwfl, Vwfr, Vwrl and Vwrr, and the like.

The brake ECU 70 is electrically connected to the steering angle sensor 84, the yaw rate sensor 85, the lateral acceleration sensor 86, a master cylinder pressure sensor 87 and the like, and is configured to receive output signals from those sensors. The steering angle sensor 84 is configured to generate an output signal indicative of a steering angle St of a steering wheel 84a configured to be operated by the driver. The yaw rate sensor 85 is configured to generate an output signal indicative of a yaw rate Yr of the vehicle 10. The lateral acceleration sensor 86 is configured to generate an output signal indicative of a lateral acceleration Gy of the vehicle 10. The master cylinder pressure sensor 87 is configured to generate an output signal indicative of a master cylinder pressure Pm. In addition, the steering angle sensor 84, the yaw rate sensor 85 and the lateral acceleration sensor 86 detect the steering angle St, the yaw rate Yr and the lateral acceleration Gy, respectively, in such a manner that each of the sensors generates a positive value when the vehicle is turning left.

Further, the brake ECU 70 calculates, based on the master cylinder pressure Pm, a target braking force Fbflt of the left front wheel WFL, a target braking force Fbfrt of the right front wheel WFR, a target braking force Fbrlt of the left rear wheel WRL, and a target braking force Fbrrt of the right rear wheel WRR. The brake ECU 70 controls a braking pressure of the wheel cylinder (44FL, 44FR, 44RL and 44RR) corresponding to each wheel in such a manner that an actual braking force of each wheel matches up with (becomes equal to) the corresponding target braking force.

Hereinafter, information on the current traveling state of the vehicle 10 such as the wheel speed Vw, the driving torque Tw, the yaw rate Yr, the lateral acceleration Gy and the steering angle St will be also referred to as "traveling state information".

<Operation of First Apparatus>

An operation of the first apparatus will be described below. The first apparatus sets the coupling torque of the first clutch 361 and the coupling torque of the second clutch 362 to zero during braking of the vehicle 10. Further, when a degree of a yaw movement for deflecting the vehicle 10 to the left or right is increased due to the braking force applied to each wheel of the vehicle 10, the first apparatus controls the coupling torque of the first clutch 361 and the coupling torque of the second clutch 362 (that is, the first apparatus performs a yaw movement suppression control). In this manner, the first apparatus generates a yaw moment in a direction opposite to the yaw movement (that is, a moment in a direction to cancel out the yaw movement) to thereby decrease the degree of the yaw movement.

The above-mentioned control for generating the yaw moment will be also referred to as a "specific control". The specific control is performed in a situation in which the vehicle 10 goes/runs substantially straight ahead and the braking force is applied to the front wheels (WFL and WFR) and the rear wheels (WRL and WRR) by the braking device 40. When the driver operates the steering wheel 84a to turn the vehicle 10, the driver intends to generate a yaw movement of the vehicle 10. In this situation, there is no need to forcibly generate a yaw moment independent of the steering operation of the driver. Therefore, when the vehicle 10 is caused to turn, the specific control described above is not performed.

Next, according to an example illustrated in FIG. 2, the specific control will be described in a situation in which the vehicle 10 is deflected to the left side. In the example illustrated in FIG. 2, the vehicle 10 goes/runs straight in a direction X before time t1. At time t1, the driver operates the brake pedal 41. This operation causes the braking device 40 to apply the braking force to the front wheels (WFL and WFR) and the rear wheels (WRL and WRR). At this time point, the first clutch 361 and the second clutch 362 are in the second state (that is, a coupling torque CuRL of the first clutch 361 and a coupling torque CuRR of the second clutch 362 are both zero).

Every time a predetermined period of time elapses, the 4WD ECU 60 calculates a first difference (Vwrr−Vwrl) which is a difference between the wheel speed Vwrr of the right rear wheel WRR and the wheel speed Vwrl of the left rear wheel WRL. The 4WD ECU 60 determines whether or not the first difference is equal to or larger than a predetermined first threshold Th1. In the example illustrated in FIG. 2, at time t2, the first difference (Vwrr−Vwrl) becomes equal to or larger than the first threshold Th1. In this case, since the wheel speed Vwrl of the left rear wheel WRL is lower than the wheel speed Vwrr of the right rear wheel WRR, the vehicle 10 is being deflected to the left side with respect to the direction X. Further, it is considered that the degree of deflection to the left side of the vehicle 10 is larger than a predetermined degree (hereinafter, referred to as a "first degree") because the first difference (Vwrr−Vwrl) is relatively increased. Therefore, when the first difference (Vwrr−Vwrl) becomes equal to or larger than the first threshold Th1, the 4WD ECU 60 changes the state of the first clutch 361 corresponding to the rear wheel (that is, the left rear wheel WRL having a lower wheel speed) at the same side as the direction of the yaw movement from the second state to the first state. In parallel with the above control, the 4WD ECU 60 maintains at the second state the state of the second clutch 362 corresponding to the rear wheel (that is, the right rear wheel WRR) at the opposite side to the direction of the yaw movement.

More specifically, the 4WD ECU 60 sets an instruction value (target value) C1 of the coupling torque CuRL of the first clutch 361 to a predetermined torque value A (first torque value) which is larger than zero, to thereby change/transit the state of the first clutch 361 from the second state to the first state. For example, the torque value A is the maximum value of the coupling torque, or a value close to that maximum value. As illustrated in FIG. 2, the 4WD ECU 60 gradually (continuously) increases the coupling torque CuRL of the first clutch 361 in such a manner that the coupling torque CuRL becomes equal to the predetermined torque value A. A magnitude of change amount of the coupling torque CuRL per unit time at this time is "K1".

As described above, the final gear ratio at the rear wheel side is set to be smaller than the final gear ratio at the front wheel side. Therefore, during braking of the vehicle 10, the driving force of the driving device 20 is transmitted to the rear wheel (WRL) having the lower wheel speed among the rear wheels to thereby increase the wheel speed Vwrl of the rear wheel (WRL). In this manner, the first apparatus generates the yaw moment in the direction opposite to the yaw movement to the left side to thereby suppress the yaw movement.

Even after the above control of the coupling torque CuRL of the first clutch 361 (that is, the yaw movement suppression control) is started, the 4WD ECU 60 calculates the first difference (Vwrr−Vwrl) every time the predetermined period of time elapses. The 4WD ECU 60 determines whether or not the first difference (Vwrr−Vwrl) is smaller than a predetermined second threshold Th2. The second threshold Th2 is a value smaller than the first threshold Th1, and is a threshold for determining that the degree of the yaw movement is suppressed/decreased to a predetermined second degree which is smaller than the first degree. In the example illustrated in FIG. 2, at time t3, the first difference (Vwrr−Vwrl) becomes smaller than the second threshold Th2. This means that the degree of the yaw movement to the left side is suppressed to the predetermined second degree, that is, the vehicle 10 is gradually facing in the original traveling direction X (traveling direction intended by the driver). Therefore, at time t3, the 4WD ECU 60 sets the instruction value C1 of the coupling torque CuRL of the first clutch 361 to a predetermined torque value (second torque value) which is equal to or larger than zero, and is smaller than the torque value A. In the present example, the 4WD ECU 60 sets the instruction value C1 of the coupling torque CuRL of the first clutch 361 to a value (A−ΔA) as the second torque value. ΔA is a predetermined amount for reducing the coupling torque.

Figure 2:
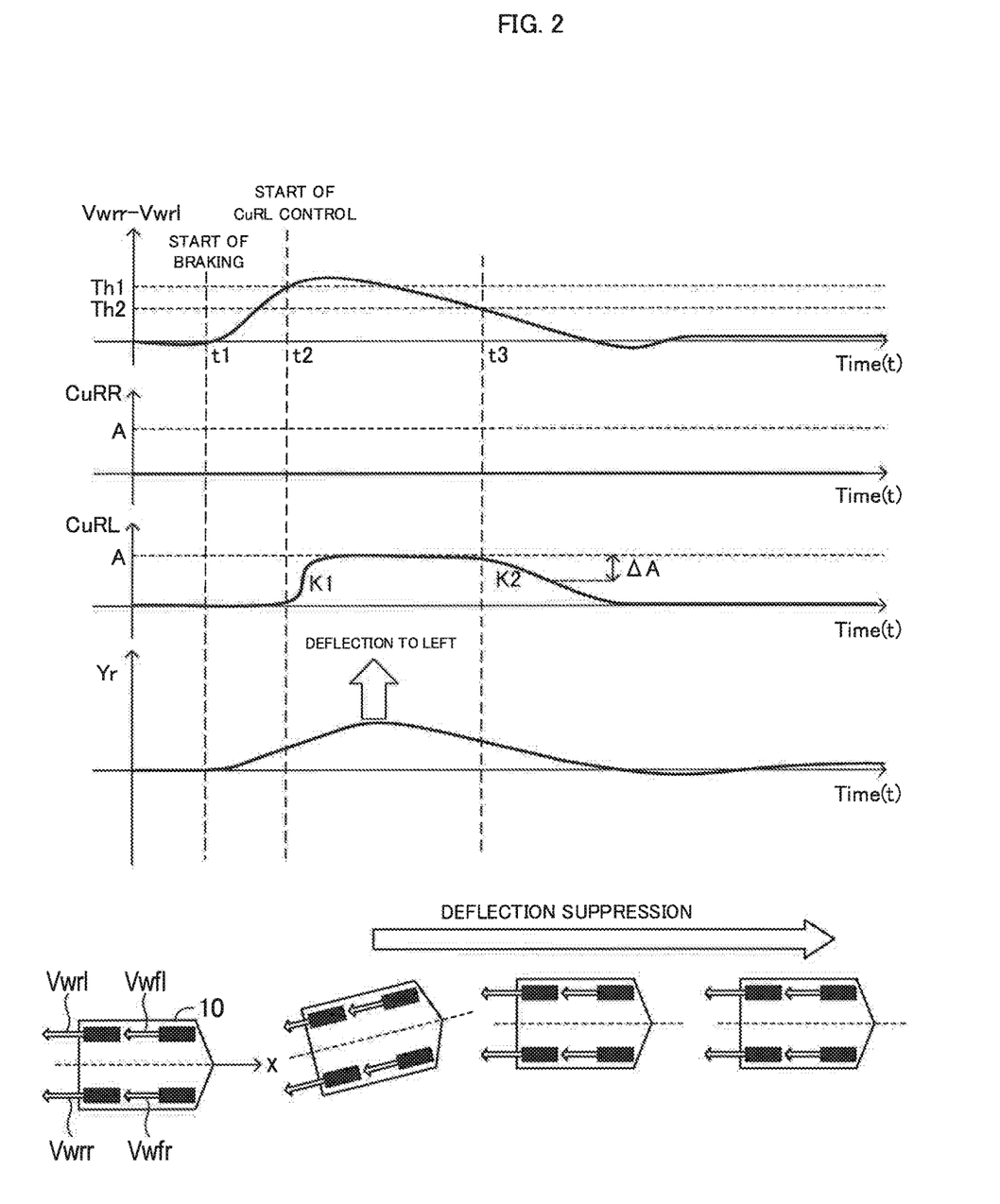
FIG. 2 is a diagram for explaining an operation of a 4WD ECU according to the first embodiment in a case where the vehicle is deflected to the left side.

In the example illustrated in FIG. 2, the 4WD ECU 60 gradually (continuously) decreases the coupling torque CuRL of the first clutch 361 in such a manner that the coupling torque CuRL becomes equal to "A−ΔA". In this manner, after the deflection to the left side of the vehicle 10 is suppressed, the yaw moment in the direction opposite to the yaw movement of the vehicle 10 is gradually decreased. Therefore, the vehicle 10 can be smoothly directed to the original traveling direction X while suppressing a large behavior change (deflection to the right side of the vehicle 10).

In some embodiments, "a magnitude K2 of change amount of the coupling torque CuRL of the first clutch 361 per unit time" when decreasing the coupling torque CuRL to "A−ΔA" be smaller than "the magnitude K1 of change amount of the coupling torque CuRL per unit time" when increasing the coupling torque CuRL to "A". This is due to the following reason. In the case where the deflection to the left side of the vehicle 10 occurs, it is desirable that the deflection be suppressed in a shorter time. Therefore, the first apparatus sets the magnitude K1 of change amount of the coupling torque CuRL of the first clutch 361 per unit time to a relatively large value to thereby increase the coupling torque CuRL to "A" in a short time. On the other hand, if the coupling torque CuRL is suddenly decreased after the deflection to the left side of the vehicle 10 is suppressed, there is a possibility that the behavior of the vehicle 10 is greatly changed (that is, the vehicle 10 is rapidly deflected to the right side). Therefore, the first apparatus sets the magnitude K2 of change amount of the coupling torque CuRL of the first clutch 361 per unit time to a relatively small value. Accordingly, the first apparatus can smoothly direct the vehicle 10 in/to the original traveling direction X while suppressing the behavior change of the vehicle 10 more effectively.

Every time the predetermined period of time elapses, the 4WD ECU 60 decreases the instruction value C1 of the coupling torque CuRL of the first clutch 361 by "ΔA". When the instruction value C1 becomes smaller than zero (C1<0), the 4WD ECU 60 sets the instruction value C1 of the coupling torque CuRL of the first clutch 361 to zero. In this manner, the 4WD ECU 60 gradually decreases the coupling torque CuRL of the first clutch 361 to thereby change/transit the state of the first clutch 361 from the first state to the second state finally.

Next, according to an example illustrated in FIG. 3, the specific control will be described in a situation in which the vehicle 10 is deflected to the right side. In the example illustrated in FIG. 3, the vehicle 10 goes/runs straight in the direction X before time t1. At time t1, the driver operates the brake pedal 41. This operation causes the braking device 40 to apply the braking force to the front wheels (WFL and WFR) and the rear wheels (WRL and WRR). At this time point, the first clutch 361 and the second clutch 362 are in the second state (that is, the coupling torque CuRL of the first clutch 361 and the coupling torque CuRR of the second clutch 362 are both zero).

Every time the predetermined period of time elapses, the 4WD ECU 60 calculates a second difference (Vwrl−Vwrr) which is a difference between the wheel speed Vwrl of the left rear wheel WRL and the wheel speed Vwrr of the right rear wheel WRR. The 4WD ECU 60 determines whether or not the second difference is equal to or larger than the predetermined first threshold Th1. In the example illustrated in FIG. 3, at time t2, the second difference (Vwrl−Vwrr) becomes equal to or larger than the first threshold Th1. In this case, since the wheel speed Vwrr of the right rear wheel WRR is lower than the wheel speed Vwrl of the left rear wheel WRL, the vehicle 10 is being deflected to the right side with respect to the direction X. When the second difference (Vwrl−Vwrr) becomes equal to or larger than the first threshold Th1, the 4WD ECU 60 determines that the degree of deflection to the right side of the vehicle 10 is larger than the predetermined first degree. Therefore, the 4WD ECU 60 changes/transits the state of the second clutch 362 corresponding to the rear wheel (that is, the right rear wheel WRR having a lower wheel speed) at the same side as the direction of the yaw movement from the second state to the first state. In parallel with the above control, the 4WD ECU 60 maintains at the second state the state of the first clutch 361 corresponding to the rear wheel (that is, the left rear wheel WRL) at the opposite side to the direction of the yaw movement.

More specifically, the 4WD ECU 60 starts the yaw movement suppression control for setting an instruction value (target value) C2 of the coupling torque CuRR of the second clutch 362 to the predetermined torque value A (first torque value). In the example illustrated in FIG. 3, the 4WD ECU 60 gradually increases the coupling torque CuRR of the second clutch 362 in such a manner that the coupling torque CuRR becomes equal to the predetermined torque value A.

As described above, during braking of the vehicle 10, the driving force of the driving device 20 is transmitted to the rear wheel (WRR) having the lower wheel speed among the rear wheels) to thereby increase the wheel speed Vwrr of the rear wheel (WRR). In this manner, the first apparatus generates the yaw moment in the direction opposite to the yaw movement to the right side to thereby suppress the yaw movement.

Even after the above control of the coupling torque CuRR of the second clutch 362 (that is, the yaw movement suppression control) is started, the 4WD ECU 60 calculates the second difference (Vwrl−Vwrr) every time the predetermined period of time elapses. The 4WD ECU 60 determines whether or not the second difference (Vwrl−Vwrr) is smaller than the predetermined second threshold Th2. In the example illustrated in FIG. 3, at time t3, the second difference (Vwrl−Vwrr) becomes smaller than the second threshold Th2. Therefore, at time t3, the 4WD ECU 60 determines that the degree of the yaw movement is suppressed/decreased to the predetermined second degree. Then, the 4WD ECU 60 sets the instruction value C2 of the coupling torque CuRR of the second clutch 362 to the value (A−ΔA) as the second torque value. The 4WD ECU 60 gradually decreases the coupling torque CuRR of the second clutch 362 in such a manner that the coupling torque CuRR becomes equal to "A−ΔA".

Every time the predetermined period of time elapses, the 4WD ECU 60 decreases the instruction value C2 of the coupling torque CuRR of the second clutch 362 by "AA". When the instruction value C2 becomes smaller than zero (C2<0), the 4WD ECU 60 sets the instruction value C2 of the coupling torque CuRR of the second clutch 362 to zero. In this manner, the 4WD ECU 60 gradually decreases the coupling torque CuRR of the second clutch 362 to change/transit the state of the second clutch 362 from the first state to the second state finally.

Further, even in this case, the 4WD ECU 60 changes the coupling torque CuRR of the second clutch 362 in such a manner that "the magnitude K2 of change amount of the coupling torque CuRR per unit time" when decreasing the coupling torque CuRR to "A−ΔA" is smaller than "the magnitude K1 of change amount of the coupling torque CuRR per unit time" when increasing the coupling torque CuRR to "A".

<Operation of First Apparatus>

Next, a concrete an operation of the CPU of the 4WD ECU 60 (hereinafter, simply referred to as the "CPU") will be described. The CPU is configured or programmed to execute a "specific control execution routine" of FIG. 4 shown by a flowchart every time a predetermined period of time elapses.

Figure 4:
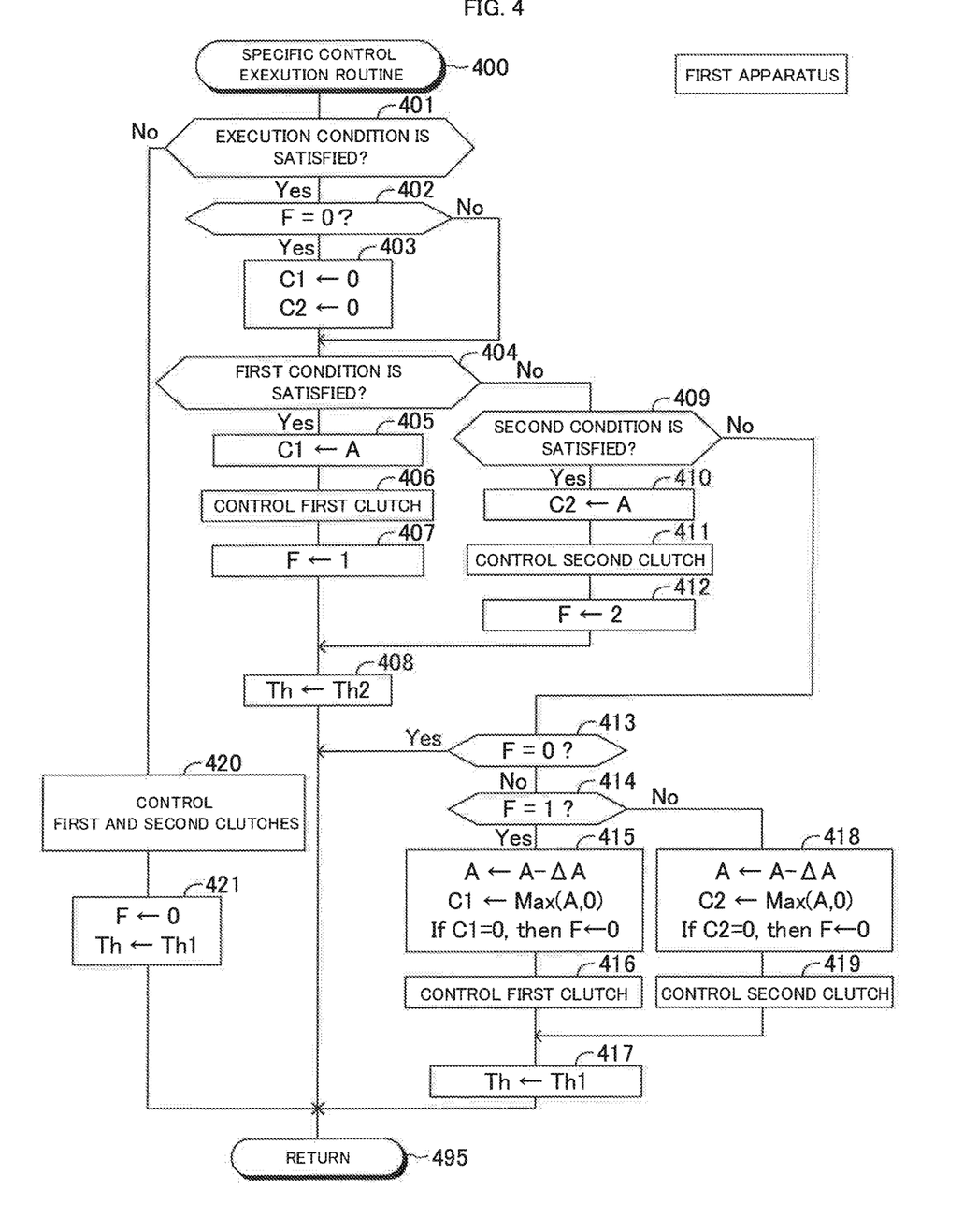
FIG. 4 is a flowchart for illustrating a "specific control execution routine" executed by the 4WD ECU according to the first embodiment.

As a predetermined timing arrives, the CPU starts the routine of FIG. 4 from Step 400, and proceeds to Step 401 to determine whether or not a predetermined execution condition is satisfied.

The predetermined execution condition is satisfied when the following conditions 1 and 2 are both satisfied.

(condition 1): The vehicle 10 is going/running substantially straight ahead (that is, the following Expression is satisfied: $|St|<\delta o$). "St" is the steering angle of the steering wheel 84a, and "$\delta o$" is a predetermined angle.

(condition 2): The braking force is being applied to the front wheels (WFL and WFR) and the rear wheels (WRL and WRR) by the braking device 40. That is, the master cylinder pressure Pm is higher than a predetermined value (for example, zero). Alternatively, a brake switch (not shown) may be used. The brake switch is configured to generate/output an on-signal when the brake pedal 41 is operated by the driver. In this configuration, the CPU determines whether or not the brake switch is generating/outputting the on-signal. When the brake switch is generating/outputting the on-signal, the CPU determines that the condition 2 is satisfied.

When the execution condition is not satisfied, the CPU makes a "No" determination at Step 401, and then, proceeds directly to Step 420. At Step 420, the CPU controls the first clutch 361 and the second clutch 362 in response to the state of the vehicle 10. For example, when the vehicle 10 is turning, the CPU sets the instruction value C1 of the coupling torque CuRL of the first clutch 361 and the instruction value C2 of the coupling torque CuRR of the second clutch 362 in response to the turning direction recognized based on the traveling state information, respectively. In another example, in a situation in which the vehicle 10 travels on an expressway, the CPU may change/transit both of the first clutch 361 and the second clutch 362 to the second state to thereby cause the vehicle 10 to travel by the front-drive (FF). Thereafter, at Step 421, the CPU sets a flag F to "0", and sets a threshold Th to the first threshold Th1. Next, the CPU proceeds to Step 495 to tentatively terminate the present routine. In executing the present specific control routine, the flag F is set to "1" when the first clutch 361 is set to the first state, and the flag F is set to "2" when the second clutch 362 is set to the first state, as will be described in detail.

On the other hand, when the execution condition is satisfied, the CPU makes a "Yes" determination at Step 401, and proceeds to Step 402 to determine whether or not the flag F is "0".

Now, it is assumed that the flag F is "0". In this case, the CPU makes a "Yes" determination at Step 402, and proceeds to Step 403. At Step 403, the CPU sets both of the instruction value C1 of the coupling torque CuRL of the first clutch 361 and the instruction value C2 of the coupling torque CuRR of the second clutch 362 to "0". Then, the CPU controls the coupling torque CuRL of the first clutch 361 based on the instruction value C1, and controls the coupling torque CuRR of the second clutch 362 based on the instruction value C2. That is, the CPU changes/transits the state of each of the first clutch 361 and the second clutch 362 to the second state. Next, the CPU proceeds to Step 404.

Hereinafter, the processes after Step 404 will be described separately for two cases (namely, (Case 1) and (Case 2)):

(Case 1) The vehicle 10 is deflected to the left side with respect to the original traveling direction X (See FIG. 2).

Figure 3:
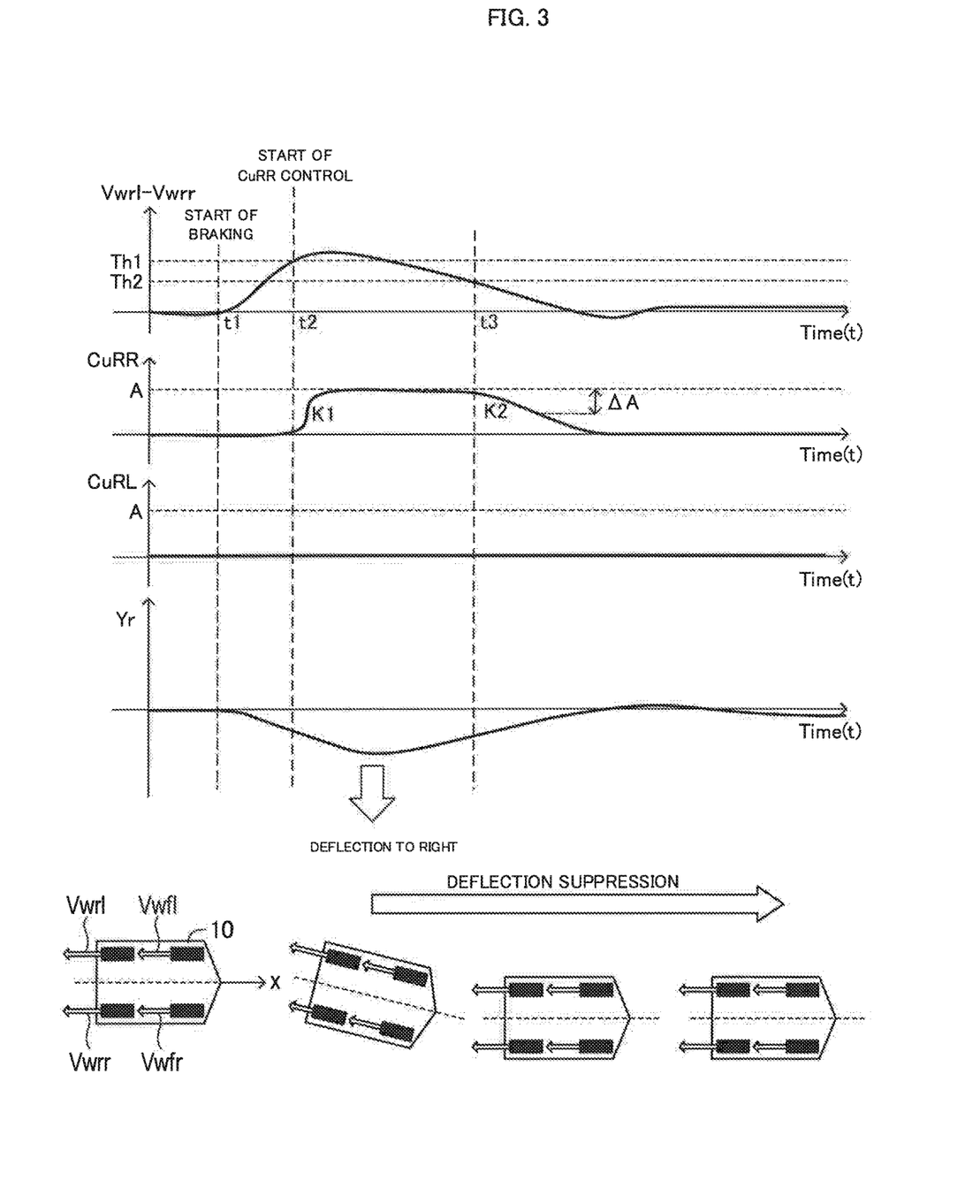
FIG. 3 is a diagram for explaining an operation of the 4WD ECU according to the first embodiment in a case where the vehicle is deflected to the right side.

(Case 2) The vehicle 10 is deflected to the right side with respect to the original traveling direction X (See FIG. 3).

(Case 1) The Case where the Vehicle 10 Starts to be Deflected to the Left Side with Respect to the Original Traveling Direction X.

At Step 404, the CPU determines whether or not a predetermined first condition is satisfied. The predetermined first condition is satisfied when the following Expression (2) is satisfied. At the current time point, the threshold Th is equal to the first threshold Th1. Therefore, at Step 404, the CPU determines whether or not the degree of the yaw movement for deflecting the vehicle 10 to the left side becomes larger than the predetermined first degree due to the braking force applied to each wheel.

$$Vwrr-Vwrl \geq Th \qquad (2)$$

If the degree of the deflection to the left side of the vehicle 10 is small at the current time point, Expression (2) is not satisfied. Therefore, the CPU makes a "No" determination at Step 404, and proceeds to Step 409. Next, at Step 409, the CPU determines whether or not a predetermined second condition is satisfied. The predetermined second condition is satisfied when the following Expression (3) is satisfied. At the current time point, the threshold Th is equal to the first threshold Th1. Therefore, at Step 409, the CPU determines whether or not the degree of the yaw movement for deflecting the vehicle 10 to the right side becomes larger than the predetermined first degree due to the braking force applied to each wheel.

$$Vwrl-Vwrr \geq Th \qquad (3)$$

In this case, since the vehicle 10 does not be deflected to the right side, Expression (3) is not satisfied. Therefore, the CPU makes a "No" determination at Step 409, and proceeds to Step 413. At Step 413, the CPU determines whether or not the flag F is "0". Now, the flag F is "0". Therefore, the CPU makes a "Yes" determination at Step 413, and proceeds to Step 495 to tentatively terminate the present routine.

The above-mentioned processes are repeated while the execution condition is satisfied and neither the first condition nor the second condition is satisfied. In such a situation, as the degree of the deflection of the vehicle 10 with respect to the traveling direction X becomes large, the first condition is satisfied. In this case, the CPU executes the processes of Step 401 to Step 403, and then, makes a "Yes" determination at Step 404. Thereafter, the CPU sequentially executes the following processes of Steps 405 to 408. Next, the CPU proceeds to Step 495 to tentatively terminate the present routine.

Step 405: The CPU sets the instruction value C1 of the coupling torque CuRL of the first clutch 361 to the predetermined torque value A.

Step 406: The CPU controls the coupling torque CuRL of the first clutch 361 based on the instruction value C1. That is, the CPU starts the yaw movement suppression control. Specifically, the CPU gradually increases the coupling torque CuRL of the first clutch 361 in such a manner that the magnitude of change amount of the coupling torque CuRL per unit time is "K1". In this manner, the CPU gradually increases the coupling torque CuRL to the predetermined torque value A.

Step 407: The CPU sets the flag F to "1".

Step 408: The CPU sets the threshold Th to the second threshold Th2. As described above, the second threshold Th2 is a value smaller than the first threshold Th1.

As the above-mentioned processes are repeated, the coupling torque CuRL of the first clutch 361 is gradually increased. The degree of the yaw movement to the left side of the vehicle 10 becomes small, and therefore, the traveling direction of the vehicle 10 gradually faces in the original traveling direction X. At that time, since the first difference (Vwrr−Vwrl) is smaller than the second threshold Th2, the first condition (i.e., Expression (2)) is not satisfied. When the CPU again proceeds to Step 404 in this situation, the CPU makes a "No" determination and proceeds to Step 409. That is, at Step 404, the CPU determines that the degree of the yaw movement for deflecting the vehicle 10 to the left side due to the braking force applied to each wheel is suppressed (decreased) to the second degree.

Since the second condition is not satisfied in this situation, the CPU makes a "No" determination at Step 409, and proceeds to Step 413.

Since the flag F is now "1", the CPU makes a "No" determination at Step 413, and proceeds to Step 414. At Step 414, the CPU determines whether or not the flag F is "1". Since the flag F is "1", the CPU makes a "Yes" determination at Step 414, and sequentially executes the following processes of Steps 415 to 417. Next, the CPU proceeds to Step 495 to tentatively terminate the present routine.

Step 415: The CPU subtracts the amount of reduction AA of the coupling torque from the current value A to obtain a value "A−ΔA", and updates the value A to the obtained value "A−ΔA". Further, the CPU selects the larger one of the updated value A and "0" as the instruction value C1 of the coupling torque CuRL of the first clutch 361. "Max (A, 0)" in Step 415 is a function for selecting the maximum value among "A" and "0". That is, when the updated value A is larger than "0", the CPU sets the instruction value C1 to the updated value A. When the updated value A is equal to or smaller than "0", the CPU sets the instruction value C1 to "0". In addition, when the instruction value C1 becomes "0", the CPU sets the flag F to "0".

Step 416: The CPU controls the coupling torque CuRL of the first clutch 361 based on the instruction value C1. Specifically, the CPU gradually decreases the coupling torque CuRL of the first clutch 361 in such a manner that the magnitude of change amount of the coupling torque CuRL per unit time is "K2". In this manner, the CPU gradually decreases the coupling torque CuRL to the instruction value C1.

Step 417: The CPU sets the threshold Th to the first threshold Th1.

By the above-mentioned series of processes, the CPU can generate, in the vehicle 10, the yaw moment in the direction opposite to the yaw movement to the left side to thereby suppress the yaw movement to the left side of the vehicle 10.

(Case 2) the Case where the Vehicle 10 Starts to be Deflected to the Right Side with Respect to the Original Traveling Direction X.

Also in this case, if the degree of the deflection to the right side of the vehicle 10 is small, neither the first condition nor the second condition is satisfied. Further, the flag F is "0". Therefore, the CPU proceeds to Step 495 through Steps 401 to 404, Step 409 and Step 413. As a result, the first clutch 361 and the second clutch 362 are both maintained at the second state.

The above-mentioned processes are repeated while the execution condition is satisfied and neither the first condition nor the second condition is satisfied. In such a situation, as the degree of the deflection of the vehicle 10 with respect to the traveling direction X becomes large, the second condition is satisfied. In this case, when the CPU proceeds to Step 409, the CPU makes a "Yes" determination. At the current time point, the threshold Th is equal to the first threshold Th1. Therefore, at Step 409, the CPU determines that the degree of the yaw movement for deflecting the vehicle 10 to the right side becomes larger than the predetermined first degree due to the braking force applied to each wheel. Thereafter, the CPU sequentially executes the following processes of Steps 410 to 412 and Step 408. Next, the CPU proceeds to Step 495 to tentatively terminate the present routine.

Step 410: The CPU sets the instruction value C2 of the coupling torque CuRR of the second clutch 362 to the predetermined torque value A.

Step 411: The CPU controls the coupling torque CuRR of the second clutch 362 based on the instruction value C2. That is, the CPU starts the yaw movement suppression control. Specifically, the CPU gradually increases the coupling torque CuRR of the second clutch 362 in such a manner that the magnitude of change amount of the coupling torque CuRR per unit time is "K1". In this manner, the CPU gradually increases the coupling torque CuRR to the predetermined torque value A.

Step 412: The CPU sets the flag F to "2".

Step 408: The CPU sets the threshold Th to the second threshold Th2.

As the above-mentioned processes are repeated, the coupling torque CuRR of the second clutch 362 is gradually increased. The degree of the yaw movement to the right side of the vehicle 10 becomes small, and therefore, the traveling direction of the vehicle 10 gradually faces in the original traveling direction X. At that time, since the second difference (Vwrl−Vwrr) is smaller than the second threshold Th2, the second condition (i.e., Expression (3)) is not satisfied. When the CPU again proceeds to Step 409 in this situation, the CPU makes a "No" determination and proceeds to Step 413. That is, at Step 409, the CPU determines that the degree of the yaw movement for deflecting the vehicle 10 to the right side due to the braking force applied to each wheel is suppressed (decreased) to the second degree.

Since the flag F is now "2", the CPU makes a "No" determination at Step 413, and proceeds to Step 414. Further, the CPU makes a "No" determination at Step 414, and sequentially executes the following processes of Steps 418, 419 and 417. Next, the CPU proceeds to Step 495 to tentatively terminate the present routine.

Step 418: The CPU subtracts the amount of reduction AA of the coupling torque from the current value A to obtain a value "A−ΔA", and updates the value A to the obtained value "A−ΔA". Further, the CPU selects the larger one of the updated value A and "0" as the instruction value C2 of the coupling torque CuRR of the second clutch 362. That is, when the updated value A is larger than "0", the CPU sets the instruction value C2 to the updated value A. When the updated value A is equal to or smaller than "0", the CPU sets the instruction value C2 to "0". In addition, when the instruction value C2 becomes "0", the CPU sets the flag F to "0".

Step 419: The CPU gradually decreases the coupling torque CuRR of the second clutch 362 in such a manner that the magnitude of change amount of the coupling torque CuRR per unit time is "K2". In this manner, the CPU gradually decreases the coupling torque CuRR to the instruction value C2.

Step 417: The CPU sets the threshold Th to the first threshold Th1.

By the above-mentioned series of processes, the CPU can generate, in the vehicle 10, the yaw moment in the direction opposite to the yaw movement to the right side to thereby suppress the yaw movement to the right side of the vehicle 10.

As described above, in the case where the coupling torque CuRL and the coupling torque CuRL are both "0" while the vehicle 10 is traveling straight and is being under braking, when the degree of the yaw movement for deflecting the vehicle 10 to the left or right becomes large due to the braking force, the first apparatus increases to the torque value A (first torque value) the coupling torque of the clutch 361 or 362 corresponding to the rear wheel at the same side as the direction of the yaw movement. Here, the torque value A is a value larger than zero. Further, the first apparatus maintains at zero the coupling torque of the clutch 361 or 362 corresponding to the rear wheel at the side opposite to the direction of the yaw movement. By this control, the wheel speed of the rear wheel at the same side as the direction of the yaw movement becomes higher than the wheel speed of the rear wheel at the opposite side to the direction of the yaw movement. In this manner, the yaw moment in the direction opposite to the yaw movement occurring in the vehicle 10 (that is, yaw moment in the direction to cancel out the yaw movement) can be generated. Therefore, the yaw movement occurring during braking of the vehicle 10 can be suppressed. Furthermore, unlike the above related-art apparatus, the first apparatus does not control a solenoid valve when performing the specific control during braking of the vehicle 10. Therefore, an operating sound of the solenoid valve is not generated, and vibration of the brake pedal due to opening and closing of the solenoid valve also is not generated. Accordingly, the first apparatus can suppress discomfort feeling when the driver operates the brake pedal during braking of the vehicle 10.

Further, since the related-art apparatus controls the braking force of the vehicle by switching the solenoid valve between on and off, the moment in the direction to cancel out the yaw movement is increased or decreased in a stepwise manner. The movement of turning the vehicle in the original traveling direction and the stop of that movement are repeated, and therefore, the behavior of the vehicle when suppressing the yawing movement is not smooth. Meanwhile, the first apparatus gradually (continuously) increases or decreases the coupling torque of the clutch 361 or 362 corresponding to the rear wheel at the same side as the direction of the yaw movement. Therefore, the behavior of the vehicle 10 when being oriented in the original traveling direction X is smoothed.

Second Embodiment

Next, a control apparatus for a four-wheel-drive vehicle (hereinafter, referred to as a "second apparatus") according to a second embodiment will be described. The vehicle 10 to which the second apparatus is applied is different from that to which the first apparatus is applied in that it further includes a disconnect mechanism. The second apparatus is different from the first apparatus in that the CPU of the second apparatus executes a "specific control routine shown by a flowchart in FIG. 6 in place of the routine of FIG. 4". Hereinafter, this difference will be mainly described.

Figure 5:
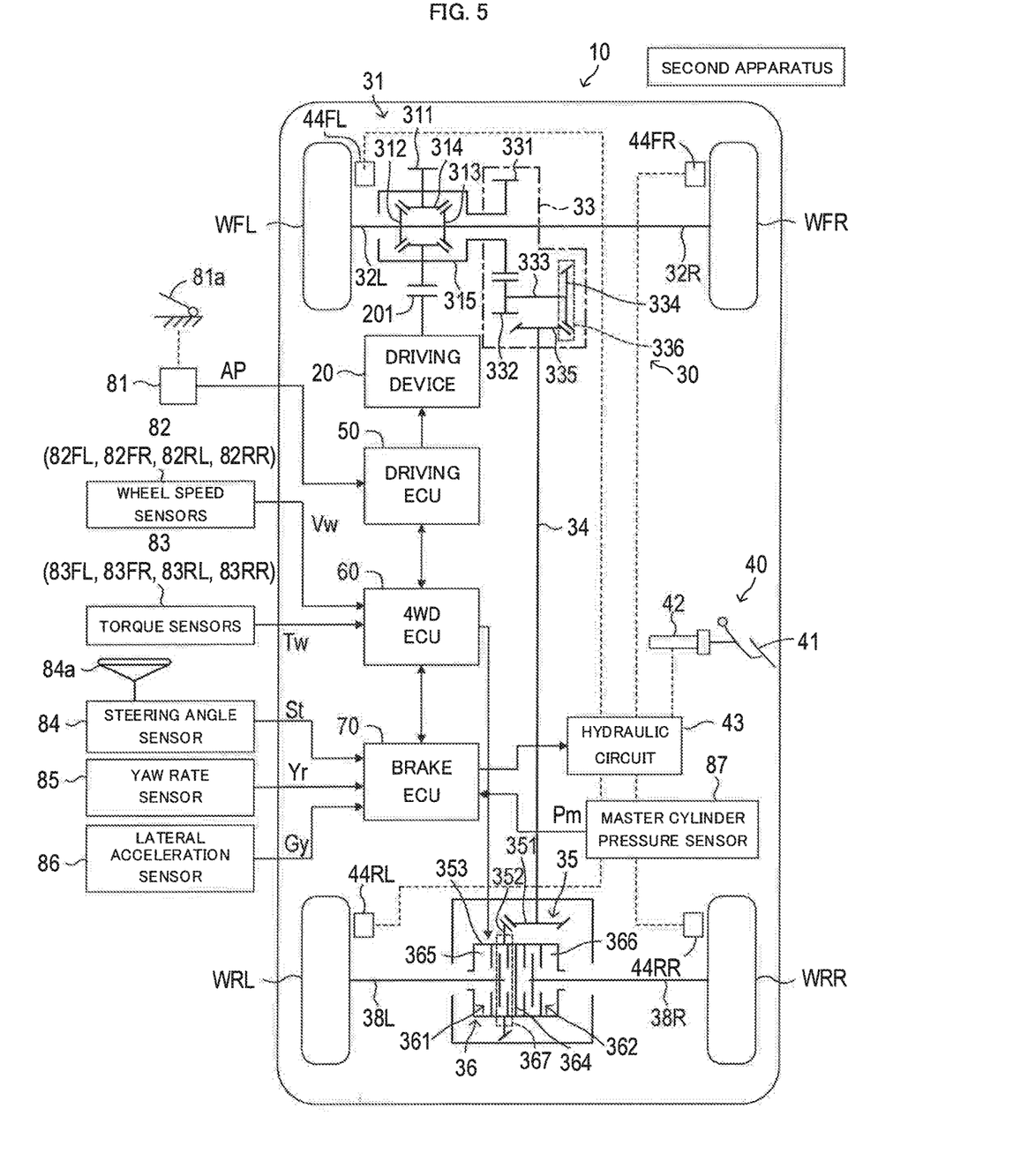
FIG. 5 is a schematic configuration diagram for illustrating a four-wheel-drive vehicle according to a second embodiment, and a control apparatus according to the second embodiment applied to the four-wheel-drive vehicle.

The disconnect mechanism is a mechanism configured to disconnect at an any point a connection between the driving device 20 and the rear wheel final gear device 35 to switch the state of the vehicle 10 from a four-wheel-drive state (4WD state) to a two-wheel-drive state (2WD state).

More specifically, as illustrated in FIG. 5, the transfer gear device 33 further includes a third clutch 336 configured to selectively provide a connection/disconnection between the first ring gear 334 and the first pinion gear 335. Further, the rear wheel final gear device 35 further includes a fourth clutch 367 configured to selectively provide a connection/disconnection between the second ring gear 352 and the rear differential case 353. The third clutch 336 and the fourth clutch 367 correspond to the above-mentioned disconnect mechanism.

The four-wheel-drive vehicle including the above-mentioned disconnect mechanism can stop the rotation of the propeller shaft 34 by switching the state of the vehicle 10 to the 2WD state. Therefore, it is possible to reduce the friction loss to improve the fuel consumption of the vehicle 10.

Hereinafter, the following state will be referred to as a "connection state": the third clutch 336 connects between the first ring gear 334 and the first pinion gear 335, and the fourth clutch 367 connects between the second ring gear 352 and the rear differential 353.

Further, the following state will be referred to as a "disconnection state": the third clutch 336 disconnects between the first ring gear 334 and the first pinion gear 335, and the fourth clutch 367 disconnects between the second ring gear 352 and the rear differential 353.

In addition, the driver can perform the switching between the "connection state" and the "disconnection state" by operating a state-switching switch (not shown). This state-switching switch is a dial-type switch configured to be operated (rotated) by the driver when switching the state of the vehicle 10 between the 4WD state and the 2WD state. The state-switching switch has a first position corresponding to the 4WD state and a second position corresponding to the 2WD state. The state-switching switch is configured to transmit (generate) an ON signal (high level signal) to the 4WD ECU 60 when it is disposed at the first position, and transmit (generate) an OFF signal (low level signal) to the 4WD ECU 60 when it is disposed at the second position. The 4WD ECU 60 controls the third clutch 336 and the fourth clutch 367 based on the signal (ON or OFF signal) from the state-switching switch. Further, the 4WD ECU 60 utilizes (manages) a state flag for determining whether the state of the disconnect mechanism is in the "connection state" or the "disconnection state". When the 4WD ECU 60 instructs the third clutch 336 and the fourth clutch 367 to be in the "connection state" based on the ON signal from the state-switching switch, the 4WD ECU 60 sets the state flag to "1". When the 4WD ECU 60 instructs the third clutch 336 and the fourth clutch 367 to be in the "disconnection state" based on the OFF signal from the state-switching switch, the 4WD ECU 60 sets the state flag to "0".

Figure 6:
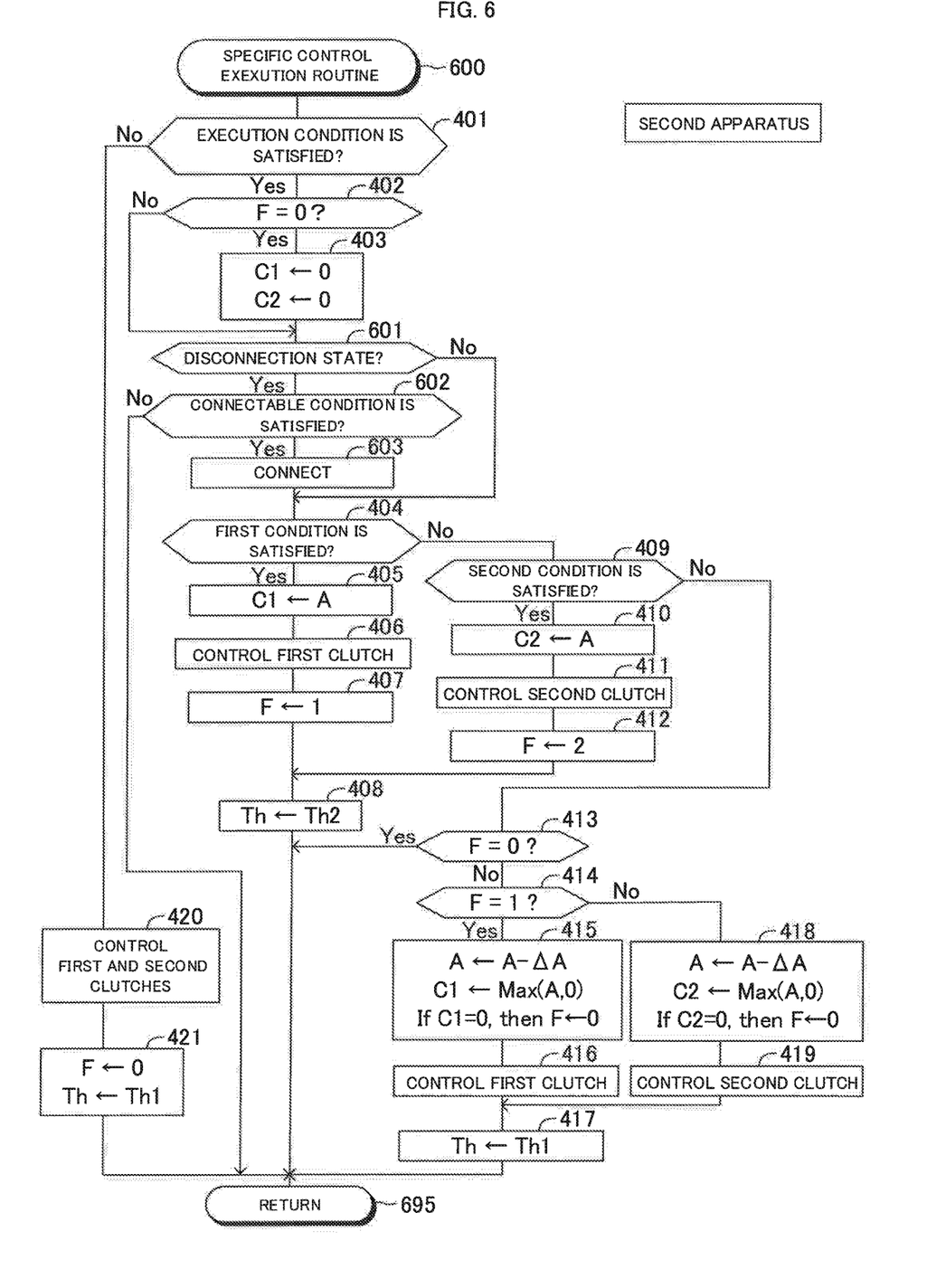
FIG. 6 is a flowchart for illustrating a "specific control execution routine" executed by the 4WD ECU according to the second embodiment.

Next, an operation of the CPU of the 4WD ECU 60 of the second apparatus (hereinafter, simply referred to as the "CPU") will be described. The CPU is configured or programmed to execute a "specific control execution routine" illustrated in FIG. 6 in place of the routine of FIG. 4 every time the predetermined period of time elapses. In FIG. 6, for each step for executing the same process as the step shown in FIG. 4, the same reference numeral in FIG. 4 is appended. The routine of FIG. 6 is a routine in which Steps 601 to 603 are inserted between Step 403 and Step 404 in the routine of the FIG. 4.

When the CPU starts the routine of FIG. 6 from Step 600 at a predetermined timing after a state in which the execution condition is not satisfied has changed to a state in which the execution condition is satisfied, the CPU executes the processes of Steps 401 to 403, and then, proceeds to Step 601.

At Step 601, the CPU determines whether or not the disconnect mechanism is in the "disconnection state" based on the state flag. When the disconnect mechanism is not in the disconnection state (that is, is in the connection state), the CPU makes a "No" determination at Step 601, and proceeds directly to Step 404.

On the other hand, when the disconnect mechanism is in the disconnection state, the CPU makes a "Yes" determination at Step 601, and proceeds to Step 602. At step 602, the CPU determines whether or not a predetermined connectable condition is satisfied. For example, the connectable condition is satisfied when the current status of the 4WD ECU 60 is in a normal status. The 4WD ECU 60 has a watch dog timer therein. The CPU monitors whether or not the 4WD ECU 60 itself is in the normal status. When the connectable condition is not satisfied (for example, when the current status of the 4WD ECU 60 is in a fail status), the CPU makes a "No" determination at Step 602, and proceeds directly to Step 695 to tentatively terminate the present routine.

On the other hand, when the connectable condition is satisfied, the CPU makes a "Yes" determination at Step 602, and proceeds to Step 603. At Step 603, the CPU controls the third clutch 336 to connect between the first ring gear 334 and the first pinion gear 335, and controls the fourth clutch 367 to connect between the second ring gear 352 and the rear differential case 353. In this manner, the state of the disconnect mechanism is changed/transited to the connection state. Thereafter, the CPU proceeds to Step 404.

The contents of Steps 404 to 421 of FIG. 6 are the same as the contents of Steps 404 to 421 of FIG. 4, respectively. Therefore, a detailed description of those steps will be omitted.

As described above, the second apparatus controls the disconnect mechanism (the third clutch 336 and the fourth clutch 367) during braking of the vehicle 10 to change the state of the disconnect mechanism to the connection state in such a manner that the driving force of the driving device 20 is transmitted to the rear wheel side. In the case where the disconnect mechanism is in the connection state, when the degree of the yaw movement for deflecting the vehicle 10 to the left or right side becomes large, the second apparatus transmits the driving force to the rear wheel at the same side as the direction of the yaw movement in the same way as the first apparatus. Therefore, the second apparatus can generate the yaw moment in the direction opposite to the yaw movement in the vehicle 10 to thereby suppress the yaw movement occurring in the vehicle 10.

The present disclosure is not limited to the above-mentioned embodiments, and various changes can be adopted within the scope of the present disclosure.

The 4WD ECU 60 may use the traveling state information other than the wheel speed to determine whether or not the degree of the yaw movement occurring in the vehicle 10 becomes large. For example, the 4WD ECU 60 may perform the above-mentioned specific control by using the output signal of the yaw rate sensor 85. In this configuration, in place of or in addition to Expression (2) used at Step 404, the following Expressions (4) and (5) may be used as the first condition. The first condition is satisfied when Expressions (4) and (5) are both satisfied.

$$|Yr\_now - Yr\_org| \geq Thy \quad (4)$$

$$Yr\_now > 0 \quad (5)$$

"Yr_org" is a yaw rate at a time point (time t1) at which the appliance of the braking force to the wheels (WFL, WFR, WRL and WRR) is started by operating the brake pedal 41. "Yr_now" is a yaw rate at the current time point. "Thy" is a threshold for yaw rate. The threshold Thy for yaw rate is set to a predetermined third threshold Th3 at each of Steps 417 and 421, and is set to a predetermined fourth threshold Th4 which is smaller than the third threshold Th3 at Step 408. The third threshold Th3 is a threshold for determining whether or not the degree of the yaw movement is larger than the first degree. The fourth threshold Th4 is a threshold for determining whether or not the degree of the yaw movement is suppressed/decreased to the second degree which is smaller than the first degree.

Further, in place of or in addition to Expression (3) used at Step 409, the following Expressions (6) and (7) may be used as the second condition. The second condition is satisfied when Expressions (6) and (7) are both satisfied.

$$|Yr\_now - Yr\_org| \geq Thy \quad (6)$$

$$Yr\_now < 0 \quad (7)$$

In addition, the yaw rate may be calculated based on the vehicle speed, the steering angle, and the lateral acceleration Gy.

The first clutch 361 and the second clutch 362 are not limited to the combination of the multiple disk type clutch and the electromagnetic clutch, respectively. The first clutch 361 and the second clutch 362 may be configured by any one of the multiple disk type clutch and the electromagnetic clutch, respectively.

The number of the clutches constituting the disconnect mechanism and the positions of those clutches are not limited to the example illustrated in FIG. 5. The second apparatus may include, as the disconnect mechanism, one or more clutches configured to selectively transmit the driving force of the driving device 20 or not transmit the driving force (that is, shut off the transmission of the driving force) at one or more positions between the driving device 20 and the rear wheel final gear device 35. For example, a clutch may be provided at any position of the propeller shaft 34.

Furthermore, both the first apparatus and the second apparatus are configured to perform the yaw movement suppression control only when the vehicle is traveling substantially straight ahead (see the above-mentioned condition 1). However, the control apparatus may be configured to perform the yaw movement suppression control even when the absolute value of the steering angle St of the steering wheel 84a is equal to or larger than a threshold δo. In this configuration, the control apparatus extrapolates a yaw rate to be generated in the vehicle 10 based on the steering angle St, the vehicle speed and the like. When an actual yaw rate during braking deviates from the extrapolated yaw rate by a predetermined value or more, the control apparatus determines that the degree of the yaw movement for deflecting the vehicle 10 to the left or right side becomes larger than the first degree due to the braking force so as to perform the above-mentioned yaw movement suppression control (that is, the specific control).

What is claimed is:

1. A control apparatus for a four-wheel-drive vehicle, comprising:
   a driving device configured to generate a driving force;
   a braking device configured to apply a braking force to a left front wheel, a right front wheel, a left rear wheel and a right rear wheel;
   a front wheel differential device configured to transmit the driving force to a left front wheel axle and a right front wheel axle, and allow a differential between the left front wheel axle and the right front wheel axle;
   a transfer gear device configured to transmit the driving force to a rear wheel side through a propeller shaft;
   a rear wheel final gear device configured to transmit the driving force from the propeller shaft to a left rear wheel axle and a right rear wheel axle;

a first coupling device configured to control a coupling torque between a driving output part of the rear wheel final gear device and the left rear wheel axle to change a transmission degree of the driving force to the left rear wheel axle; and a second coupling device configured to control a coupling torque between the driving output part and the right rear wheel axle to change a transmission degree of the driving force to the right rear wheel axle, wherein a final gear ratio on a side of the rear wheels is set to be smaller than a final gear ratio on a side of the front wheels, wherein the control apparatus further comprises:

a detector configured to detect traveling state information indicative of a current traveling state of the vehicle; and a controller configured to change the coupling torque of the first coupling device and the coupling torque of the second coupling device independently, based on the traveling state information detected by the detector, wherein, when the coupling torque of the first coupling device and the coupling torque of the second coupling device are both zero and the braking device applies the braking force to the left front wheel, the right front wheel, the left rear wheel and the right rear wheel, the controller is configured to:

based on the traveling state information detected by the detector, determine whether or not a degree of a yaw movement for deflecting the vehicle to a left or right side is larger than a predetermined first degree due to the braking force; and when the controller determines that the degree of the yaw movement is larger than the first degree, perform a yaw movement suppression control, the yaw movement suppression control being a control to increase the coupling torque of the coupling device corresponding to the rear wheel at the same side as a direction of the yaw movement from among the first coupling device and the second coupling device to a predetermined first torque value which is larger than zero; and maintain at zero the coupling torque of the coupling device corresponding to the rear wheel at an opposite side to the direction of the yaw movement from among the first coupling device and the second coupling device.

2. The control apparatus for the four-wheel-drive vehicle according to claim 1, wherein the controller is configured to determine whether or not the degree of the yaw movement is suppressed to a predetermined second degree which is smaller than the first degree during the yaw movement suppression control, based on the traveling state information, and when the controller determines that the degree of the yaw movement is suppressed to the second degree, decrease the coupling torque of the coupling device corresponding to the rear wheel at the same side as the direction of the yaw movement to a predetermined second torque value which is smaller than the first torque value.

3. The control apparatus for the four-wheel-drive vehicle according to claim 2, wherein the controller is configured to change the coupling torque in such a manner that a magnitude of change amount of the coupling torque per unit time when decreasing the coupling torque to the second torque value is smaller than a magnitude of change amount of the coupling torque per unit time when increasing the coupling torque to the first torque value.

4. The control apparatus for the four-wheel-drive vehicle according to claim 1, further comprising a mechanism configured to selectively transmit or not transmit the driving force at one or more positions between the driving device and the rear wheel final gear device to switch a state of the vehicle between a four-wheel-drive state and a two-wheel-drive state, wherein, in a case where the vehicle is in the two-wheel-drive state, the controller is configured to, when the degree of the yaw movement becomes larger than the first degree, control the mechanism to change the state of the vehicle from the two-wheel-drive state to the four-wheel-drive state, and thereafter, perform the yaw movement suppression control.

* * * * *

UNITED STATES PATENT AND TRADEMARK OFFICE
CERTIFICATE OF CORRECTION

| | |
|---|---|
| PATENT NO. | : 10,562,513 B2 |
| APPLICATION NO. | : 16/190986 |
| DATED | : February 18, 2020 |
| INVENTOR(S) | : Ryochi Watanabe |

Page 1 of 1

It is certified that error appears in the above-identified patent and that said Letters Patent is hereby corrected as shown below:

In the Specification

In Column 6, Line 51, after "right front wheel", delete "P WFR" and insert --WFR--, therefor.

In Column 12, Line 58, delete "a concrete".

Signed and Sealed this
Fourteenth Day of April, 2020

Andrei Iancu
*Director of the United States Patent and Trademark Office*